UNITED STATES PATENT OFFICE.

DANIEL W. HANNA, OF PITTSBURG, PA., ASSIGNOR TO EDMUND S. HANNA.

IMPROVEMENT IN METHODS OF UTILIZING THE WASTE CHLORIDE OF ZINC IN TREATING PAPER.

Specification forming part of Letters Patent No. 120,380, dated October 31, 1871.

*To all whom it may concern:*

Be it known that I, DANIEL W. HANNA, of Pittsburg, in the county of Allegheny and State of Pennsylvania, have invented a new and useful Method of Utilizing the Mother-Water of the Chloride of Zinc; and I do hereby declare the following to be a full, clear, and exact description thereof.

My invention consists in the utilization of the waste of the solution or mother-water of the chloride of zinc after it has been used in the treatment and manufacture of paper, as described in Letters Patent Nos. 113,454 and 114,880. In the said Letters Patent the paper or paper pulp is described as being treated to a bath of the mother-water or liquor resulting from the manufacture of the chloride of zinc or of the chlorides of tin, calcium, magnesium, or aluminium; or with a bath of the concentrated solution of the chloride of zinc.

For use in treating paper this solution is concentrated by heat to about 65° to 75° Baumé. After being treated in the solution the paper is removed to a proper vessel or trough of water, in which it is washed until free from all surplus liquor. After the washing the water contains a large percentage of the concentrated solution of chloride of zinc; and my invention consists in saving and utilizing the same, whereby I effect a great saving in the manufacture of paper in the processes described in said Letters Patent.

In the processes referred to I have discovered, by experiment, it requires from two and one-half to five pounds of the concentrated solution of the chloride of zinc to treat one pound of paper. The cost of the solution is about eight cents per pound. By my process I save from forty to ninety per cent. of the cost. After the paper has been treated to the bath of the solution it is washed in water, as described. The same water is used until the amount of the liquor washed from the paper is great enough to raise it to from 30° to 40° Baumé, more or less. It is then taken and boiled until, by the evaporation of the water, the waste or surplus solution which was washed from the paper reaches from 65° to 75° Baumé, at which gravity it is used for treating the paper, as described. Thus I am enabled to save and make use of the surplus of the solution which is not taken up by the paper, and which heretofore has been regarded as waste.

When a hard paper is required, nearly if not all of the solution is washed out from the paper, and then, of course, the saving is greater; but when a soft pliable paper is to be produced, comparatively little of the solution is washed out and then the saving is less.

I have followed the text of Letters Patent No. 113,454 in speaking only of the chloride of zinc; but I desire to claim the same process in so far as it is applicable to the other chlorides enumerated in the manufacture of paper, as therein described.

What I claim as my invention, and desire to secure by Letters Patent, is—

The hereinbefore-described method of saving and utilizing the waste or surplus mother-water of the chloride of zinc in the treatment of paper, as described in the Letters Patent hereinbefore referred to.

In testimony whereof I, the said DANIEL W. HANNA, have hereunto set my hand.

DANIEL W. HANNA.

Witnesses:
   E. T. CASSIDY,
   THOS. B. KERR. (35)